Oct. 8, 1968 A. E. VOGEL 3,404,899
METHOD AND APPARATUS FOR CONTROLLING VEHICLE SUSPENSION
Original Filed April 21, 1956
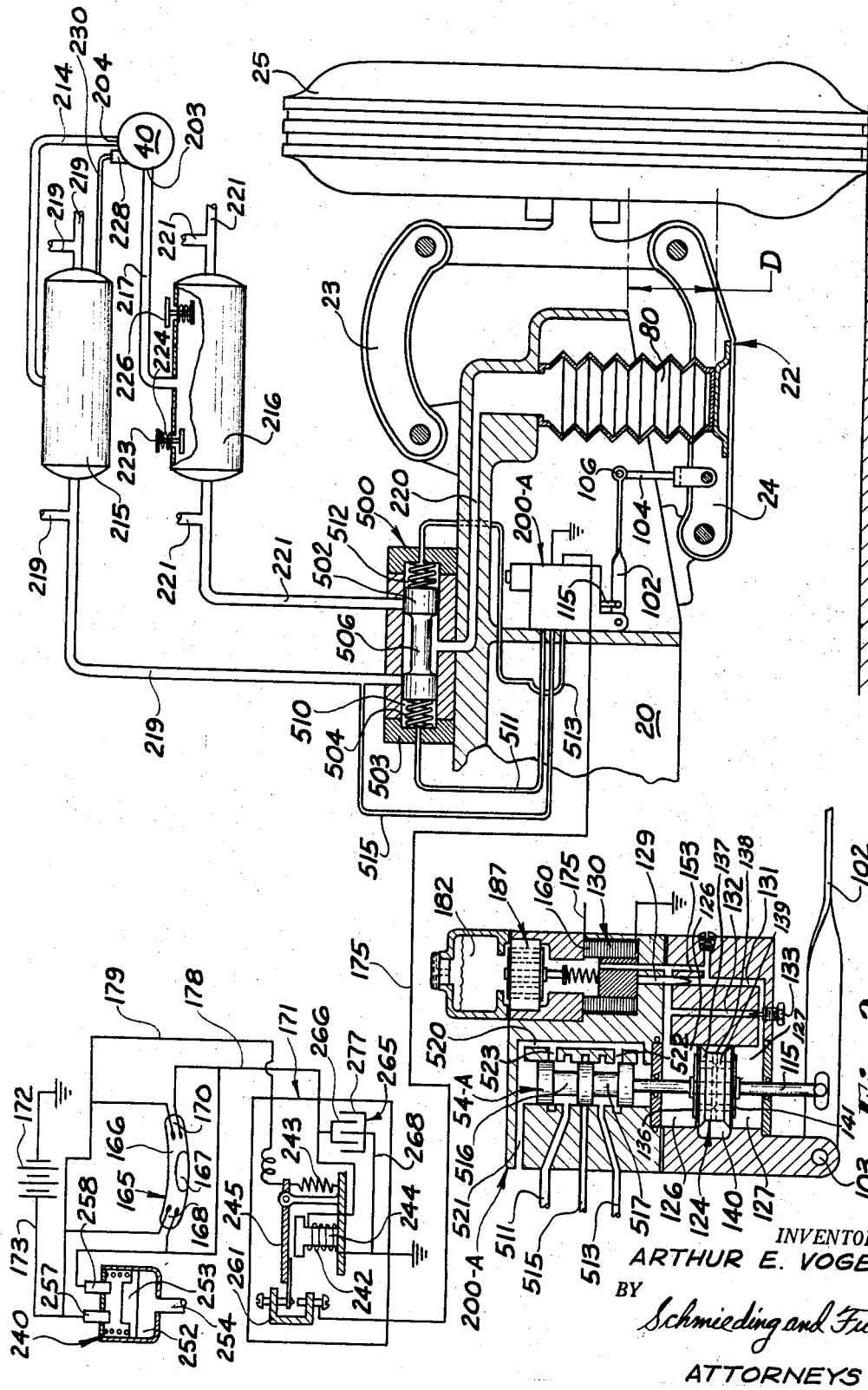
INVENTOR.
ARTHUR E. VOGEL
BY
Schmieding and Fultz
ATTORNEYS United States Patent Office 3,404,899
Patented Oct. 8, 1968

3,404,899
METHOD AND APPARATUS FOR CONTROLLING
VEHICLE SUSPENSION
Arthur E. Vogel, Columbus, Ohio, assignor, by direct and mesne assignments, of twenty-five percent each to said Vogel, Robert Dawson, Coshocton, Palmer Fultz and Warren H. F. Schmieding, both of Columbus, Ohio
Continuation of application Ser. No. 200,597, May 28, 1962, which is a division of application Ser. No. 577,777, Apr. 21, 1956, now Patent No. 3,036,844, dated May 29, 1962. This application Sept. 15, 1966, Ser. No. 579,773
15 Claims. (Cl. 280—6)

ABSTRACT OF THE DISCLOSURE

A controlled vehicle suspension system of the type that includes fluid actuated means operative between the sprung and unsprung weights of the vehicle. The system includes valve means for controlling the flow of fluid to and from said fluid actuated means and valve movement retarding means and is further characterized by means for automatically varying the rate of movement of said retarding means between certain positions of movement thereof.

The present invention relates to suspension system for vehicles and more particularly to a novel apparatus for automatically controlling such systems.

This application is a continuation of my co-pending application Ser. No. 200,597, filed May 28, 1962, now abandoned, which is a division of Ser. No. 577,777, filed Apr. 21, 1956, now Patent No. 3,036,844, issued May 29, 1962.

In general, the present apparatus is applied to motor vehicles of the type which comprise a sprung weight portion supported by four unsprung weight portions each of which includes a wheel and an independent spring means. The apparatus of the present invention includes a separate control means for each of said spring means arranged to increase and decrease the force exerted by each spring means independently of the other spring means. In addition, each control means is provided with a separate detector means adapted to sense relative movement, from a predetermined suspension configuration, between the sprung and unsprung portions at the particular spring means being controlled.

When the vehicle encounters inertia forces in negotiating a curve, the spring means towards the center of the curve normally unload stored spring energy in a manner which is detrimental to stability and consequently dangerous to the occupants. With the present invention applied, however, the previously mentioned detector means sense any tendency for the inner side of the sprung weight portion of the vehicle to move upwardly from the inner unsprung weight portions such as occurs when the sprung weight portion of a vehicle tends to lean outwardly in a curve. When such tendency is sensed, the appropriate control means are rapidly and automatically actuated, in a controlled manner, to decrease the upwardly directed force exerted by the spring means at the side towards the center of the curve being rounded. Moreover, the appropriate detector means sense the magnitude of relative movement between the sprung and unsprung portions, and command the respective control means to decrease the force exerted by an appropriate amount to maintain said sprung and unsprung portions at said predetermined relative configuration under the various magnitudes of centrifugal force to which the vehicle is subjected.

In accordance with the present invention, an improved control means is provided for air suspension systems of the type where relatively large flow volumes are required when the pressures in the air chambers of the air springs are being varied by the introduction or exhaust of air. The present air control system includes a main high flow rate valve means arranged to control the relatively large flow volumes required at the air chambers, and a flow control valve means, requiring only a relatively small flow volume, is used to shift said main valve means. This novel air system provides a compact and inexpensive apparatus which operates with a great savings in power required to control the suspension system.

In addition to the above described advantages, the present novel systems incorporate time delay mechanism of the type disclosed in my co-pending application Ser. No. 541,337, now Patent No. 3,038,739 issued June 12, 1962 for effecting a time lag in the response of said control valve means to said detector means when normal straight road conditions are being encountered. Accordingly, when road-imposed impacts are encountered at a particular spring means, the unsprung weight portion thereat will depart upwardly and downwardly and effect movements of short time duration without effecting any substantial change in the force exerted by the spring means. When the vehicle is entering a curve, however, it is desirable to effect rapid response of the control valve means to inertia forces so as to achieve roll stability without the presence of an undesirable transition period at curve entry. Such undesirable transition period would occur, at the time of curve entry, if the above mentioned time delay were retained operative when centrifugal forces are encountered since then the vehicle would start to roll or lean prior to a delayed action of the control valve means. Accordingly, the above mentioned time delay, required to prevent actuation of the control means when road imposed impacts are encountered, in straight road operation, is automatically rendered inoperative when the vehicle encounters centrifugal forces in entering a curve. Hence the control valve means will rapidly apply anti-roll corrections at the time of curve entry by the vehicle, yet such control valve means is non-sensitive to road imposed impacts.

As an additional advantage of the invention, when the vehicle is subjected to various degrees and distributions of static loads, the detector and control valve means at each of the independent spring means effect an appropriate sensing and produce a corresponding controlled variation in the force exerted by each spring means to maintain said predetermined suspension configuration at all the spring means of the vehicle and for all magnitudes and distributions of static load to which the vehicle is subjected.

Further objects and advantages of the present invention will be apparent from the following description, reference being had to the accompanying drawings wherein a preferred form of embodiment of the invention is clearly shown.

In the drawings:

FIG. 1 is a front schematic view showing the suspension system of a motor vehicle provided with a control system constructed according to the present invention, and FIG. 2 is a side sectional view of a flow control valve means comprising a portion of the system of FIG. 1. The section is taken substantially along a vertical plane through the housing of said valve means.

Referring in detail to the drawings, a sealed flexible casing 80 forming a resilient air chamber is disposed between the unsprung weight 22 and sprung weight 20 of a vehicle. The air system includes a flow control valve means 200–A similar to valve means 200 described in detail in my previously mentioned co-pending application Ser. No. 577,777, now Patent No. 3,036,844 issued May 29, 1962 but with certain modifications later to be described. Identical portions of the valve means 200–A and 200 are designated by identical numerals.

A resilient arm or operator 102 is connected to a rod 104 by the pivot pin 106. This rod 104 is suitably attached to the unsprung weight 22. The rod 115 connected to a retarding means 124 that is connected to resilient arm 102 by a rod 115 and pin 120 arm 102 is connected to the valve means casing by pivot pin 103.

A compressor for the system of FIG. 1 is indicated schematically at 40. Compressed air is forced through the outlet valve 204 and line 214 to a high pressure reservoir 215. Air is fed to the compressor through intake valve 203 from a relatively low pressure reservoir 216 via line 217.

A main high flow rate valve indicated generally at 500 functions to control the relatively large flow volume of air from reservoir 215 to resilient air chamber 80 and to reservoir 216 from resilient air chamber 80. Main valve 500 is pilot operated by the previously mentioned flow control valve means 200–A. Air is exhausted from each of the chambers 80 through line 220, valve 500, and a line 221 leading to low pressure reservoir 216, one line 221 being provided for each of the four chambers 80.

Instead of exhausting the air from the chamber 80 to atmosphere, the lines 221 are connected to the relatively low pressure reservoir 216 to provide a circulating or closed air system. This reservoir is provided with an inlet valve 223 which is urged to closed position by a spring 224. Such spring is of light construction and is merely used to hold the valve closed in the event that the air within the reservoir 216 is at atmospheric pressure. Normally, however, the pressure within reservoir 216 is substantially above atmospheric pressure. Air cannot escape reservoir 216 except through line 217 or a high pressure relief valve 226. As an example, air pressure normally existing within the relatively low pressure reservoir 216 is at forty pounds per square inch, that in the chamber 80 is approximately 80 pounds per square inch, and that in the high pressure reservoir 215 is approximately 120 pounds per square inch. Far less energy is expended in raising the pressure from 40 pounds per square inch to 120 pounds per square inch than would be expended in increasing the pressure of atmospheric air to 120 pounds per square inch. Thus by maintaining a pressure of 40 pounds per square inch, for example, in the relative low pressure reservoir 216, the system is operated more economically. The maximum high pressure within reservoir 216 can be controlled by a controller indicated generally at 228 and of a type described in detail in previously mentioned copending application Ser. No. 541,337, now Patent No. 3,038,739 issued June 12, 1962. In general controller 228 includes a pressure responsive member connected by a line 230 to the reservoir 215. After the requirements of chambers 80 cause the pressure in high pressure reservoir 215 to drop below the maximum at which the controller 228 opens the intake valve 203, then the intake valve 203 will be returned to its seat and compressor 40 will resume normal operation and supply air to the high pressure reservoir 215.

The valve 500 includes a spool 502 slideably carried in casing 503 and normally centered by springs 504. A necked portion 506 on spool 502 serves to either connect line 219 with line 220 whereby high pressure reservoir 215 communicates with chamber 80, or to connect line 221 with line 220 whereby chamber 80 exhausts to low pressure reservoir 216. The spool is shifted to the right by pressurizing valve chamber 510 via a line 511 or by pressurizing valve chamber 512 via a line 513, with lines 511 and 513 both being connected to flow control valve 200–A and selectively pressurized by a spool 54–A therein. A line 515 leads from high pressure line 219 to valve means 200–A and is normally closed by spool 54–A, in the manner illustrated, when the sprung weight 20 and unsprung weight 22 are a normal distance apart, or at normal configuration, as indicated at D in FIG. 1.

In operation, when the forces imposed on the vehicle cause normal configuration distance D to decrease spool 54–A moves upwardly whereby a neck portion 517 on the spool connects high pressure line 515 with line 513 and valve chamber 512 whereby the spool is shifted to the left to connect chamber 80 with high pressure reservoir 215 via lines 219 and 220. When the forces imposed on the vehicle cause normal configuration distance D to increase, spool 54–A moves downwardly whereby a neck portion 516 on the spool connects high pressure line 515 with line 511 and valve chamber 510 whereby the spool is shifted to the right to connect air chamber 80 with low pressure reservoir 216.

As seen in FIG. 2, the lines 511 and 513 are normally open to atmosphere via one of two ports 522 and 523, and passages 520 and 521. When one of the lines 511 or 513 is connected to high pressure line 515 the spool 54–A isolates such line from atmosphere by closing one of the ports 522 or 523 while the other line is maintained connected to atmosphere through the other of the ports 522 or 523.

Flow control valve means 200–A includes a fluid actuated valve unit indicated generally at 187 for controlling the flow of liquid from reservoir 182 to chamber portions 126 and 127. This valve unit 187 and passage 131 also provide means for the escape of any air bubbles that may accumulate in the hydraulic liquid contained in control valve means 200–A.

The structural details and operation of flow control valve means 187 is described in detail in my co-pending application Ser. No. 577,777, now Patent No. 3,036,844 issued May 29, 1962.

From the foregoing description it will be understood that the large flow volume of air required for chamber 80 is controlled by the valve 500, and that only a very small flow volume of air passes through control valve means 200–A since only a small flow volume is required to pressurize valve chambers 510 or 512 in effecting shifting of spool 502. Hence it will be understood that valve means 200–A, and the lines 511, 513, and 515 can be maintained small in size whereby compactness and economy are achieved.

Reference is again made to FIG. 2 which diagrammatically illustrates an electrical sensing apparatus adapted to operate the time delay mechanism of the previously described valve means 200–A. A mercury switch 165 is provided with a pair of contact points 168 at one inclined end of a horizontal tube 166 and a second pair of contacts 170 at the other inclined end of horizontal tube 166. When the quantity of mercury connects either of the pair of contacts 168 or 170, which occurs when the vehicle encounters centrifugal force at curve entry, a solenoid 242 of holding relay 171 is energized and a core 244 becomes magnetized whereby pivoted arm 245 pivots on pin 246 and moves downwardly against the action of tension spring 243 to make contact between an upper contact 248 and a lower contact 249.

The mercury switch contacts 168 connect the source of electricity 172 with solenoid 242 by wires 173 and 178. The other mercury switch contacts 170 connect source 172 with solenoid 242 by wires 173 and 178.

A fluid actuated switch 240 is provided in parallel with mercury switch 165 to render inoperative the electrically operated time delay valve 130 located within the control means 200–A when the vehicle encounters an inertia force which would cause longitudinal pitch of the vehicle. Such would occur when the vehicle is to be suddenly decelerated or stopped. Switch 240 includes a fluid chamber 252 fitted with a piston 253. A line 254 leading from chamber 252 can be connected to the hydraulic brake system of the vehicle, or to another suitable source of pressurized fluid. When chamber 252 is pressurized piston 253 moves upwardly against the action of a return spring 256 whereby piston 253 electrically connects a pair of contacts 257 and 258. The contacts 257 and 258 energize solenoid 242 of holding relay 171 with the source of electric energy by means of the wires 173 and 178.

The upper contact 248 of relay 171 is provided with an adjustable stop provided by a screw 260 adjustably carried by a dielectric bracket 261 mounted on metallic base 262 which base also adjustably supports lower contact 249. The dielectric bracket 261 insulates upper contact 248 from lower contact 249 when the former is in the upper position illustrated. The base 262 serves as a conductor between lower contact 249 and a wire 175 which leads to the solenoid 160 of time delay valve 130 within valve means 200-A.

When contact 248 engages contact 249 by action of solenoid 242, then the solenoid 160 of time delay valve 130 is connected to the source of electric energy by wires 173, 179, arm 245, contact 248, contact 249, and wire 175. As seen in FIG. 2 the element 129 opens the larger passage 131 whereby retarding means 124, and hence spool 54–A, will move rapidly to quickly institute an anti-roll or anti-pitch correction as required.

With continued reference to FIGS. 1 and 2, when the vehicle leaves a curve and enters a stretch of straight road it is desirable to continue to maintain the time delay mechanism inoperative for a period of time after the centrifugal force has ceased and the mercury switch 165 has broken contact, in order that the control means can rapidly, without time delay, make corrections in the chambers 80 which corrections are required because centrifugal force is ceasing and the unequal pressures in such chambers required in the curve to levelize the vehicle, are no longer required in the straight stretch of road being entered. Hence it is desirable to maintain the time delay mechanism inoperative and hence the solenoid 160 of the time delay switch 130 and the solenoid 242 of the holding relay 171 must both be maintained energized.

To maintain solenoids 242 and 160 energized after mercury switch 165 or the brake operated fluid actuated switch 240 has broken contact, a condenser 265 is connected in parallel with solenoid 242 of the holding relay. The plates 266 of the condenser are connected to wire 178 and plates 277 of the condenser are grounded by a wire 268.

When one of the switches 165 or 240 connects the source of electric energy 172 to the solenoid 242 of the holding relay, arm 245 is attracted downwardly to connect contacts 248 and 249 and condenser 265 is charged. So long as switch 162 or 240 is closed, the time delay switch 130 in the control means 100 will remain connected to the source 172 and receive electric current therefrom. When the closed switch 165 or 240 is opened, as occurs in coming out of a curve or when the brake pressure used in stopping is decreased, then the condenser 265 will begin to release its stored charge and continue to discharge for a time interval whereby solenoid 242 remains energized and the contacts 248 and 249 are maintained in engagement subsequent to opening of switch 165 or 240.

When condesser 265 discharges, the arm 245 is moved upwardly against stop 260 whereby time delay valve 130 is closed and the control means is rendered nonresponsive to road imposed impacts of short time duration in the manner previously described.

When the time delay mechanism is operative, and rapid movement of retarding means 124 away from the normal position is prevented, then the resilient arm 102 will bend upwardly or downwardly with rapid relative movement between the sprung and unsprung weight portions, yet when one of such relative movements is retained for a time duration greater than the time delay of the system then such arm provides the necessary force for continuing the movement of retarding means 124 at the slow rate it must move when time delay valve 130 is closing passage 131. Hence it is seen that the resilient arm 102 allows rapid relative movement between sprung and unsprung weight portions 20 and 22 at times when movement of retarding means 124 is retarded and cannot follow such rapid relative movements. Accordingly, the control means is rendered inoperative when road imposed impacts of short time duration are encountered. When the vehicle encounters a static load change of relative long time duration, however, such as occurs when the number of passengers is increased or decreased, the resilient arm 102 will bend and continue to bias the retarding means 124 until slow movement thereof moves spool 52 to the appropriate position for the correction required to return the sprung and unsprung weight portions 20 and 22 to the normal configuration at which they are spaced a distance D apart.

When retarding means 124 is urged upwardly by resilient arm 102, as will occur when sprung weight 20 moves downwardly relative to unsprung weight 22, an upper resilient valve member 136 is maintained closed by fluid pressure whereby fluid cannot pass through the passages 137, 138, or 139 to lower chamber 127. Hence fluid is moved either through restricted passage 132 or through both the restricted passage 132 and the larger passage 131 depending on whether or not time delay valve 130 is open or closed.

After retarding means 124 has been moved upwardly, either rapidly or slowly depending on whether or not the time delay valve 130 is open or closed, such retarding means 124 will always move rapidly back to the normal position illustrated, after a correction has been made by the control means due to the provision of a fluid actuated retarding means controller. Such controller comprises check valves 136 and 137, passages 137, 138 and 139 and recess 140. Rapid return of the retarding means 124 occurs when such retarding means is returning to the central position illustrated since the recess 140 is then in communication with lower chamber portion 127 whereby fluid pressure in such lower chamber portion 127 and recess 140 opens the resilient valve member 136 and fluid can pass readily through passages 137 and 138 and into upper chamber portion 126. Since the cross-sectional areas of passages 137 and 138 are much greater than the effective cross-sectional area of passage 132 at restrictor 133, the fluid transferred between chamber portions 127 and 126 will not slow down movement of retarding means 124 when such means is returning from an upper position until it reaches the normal position illustrated and closes by-pass recess 140.

When retarding means 124 is urged downwardly by resilient arm 102, as would occur when the sprung weight 20 rises relative to unsprung weight 22, then the lower resilient valve member 141 will be maintained closed by fluid pressure and fluid will pass from lower chamber portion 127 to upper chamber portion 126 either through the restricted passage 132 or through both the restricted passage 132 and the larger passage 131 depending on whether the element 129 of time delay valve 130 is in the closed or open position.

Retarding means 124 will return rapidly from a lower position to the normal position illustrated since upper chamber portion 126 is then in communication with recess 140 whereby fluid pressure opens resilient valve member 141 and fluid can pass directly through the passages 138 and 139 and into the restricted passage 132 until retarding means 124 closes by-pass recess 140.

When retarding means 124 arrives at the normal position illustrated, at the completion of a return movement after a correction has been made, the side of retarding means 124 forms a closure for recess 140 in the manner illustrated in FIG. 2.

It will be understood that flow control valve means 200–A can be applied to each of the four wheels of a motor vehicle whereby anti-roll control, as well as corrections for variations in static weight changes, is affected at each of the four wheels of the vehicle. As an alternative, if it is desired to effect anti-roll control at only say the front wheels of the vehicle, then a valve means 200–A would be applied at each of the front wheels of the vehicle, and a structurally more simple and less expensive control means, without a time delay control valve such as solenoid operated time delay control valve 130, could be utilized at the rear wheels of the vehicle. In such latter instance, corrections for static weight distribution would be made by a valve means 200–A at each of the four wheels, but only the valve means at the right front wheel and the valve means at the left front wheel would rapidly institute anti-roll corrections in the manner described in detail herein.

While the form of embodiment of the present invention as herein disclosed constitutes a preferred form it is to be understood that other forms might be adopted, all coming within the scope of the claims which follow:

I claim:

1. A controlled vehicle suspension system of the type having sprung and unsprung weights comprising, in combination, a high pressure reservoir; a low pressure reservoir; means for charging said high pressure reservoir with fluid from said low pressure reservoir; fluid actuated means connected between said sprung and unsprung weights; a first fluid controller having a first position isolating said fluid actuated means from both said reservoirs, a second position connecting said fluid actuated means with one of said reservoirs, and a third position connecting said fluid actuated means with the other of said reservoirs; a second fluid controller for moving said first fluid controllers between certain of said positions responsive to a force imposed on said vehicle; time delay means for effecting a delay in the responses of certain of said controllers to variations in said imposed force; and automatic sensing means for rendering said time delay means inoperative responsive to a second force imposed on said vehicle.

2. The apparatus defined in claim 1 wherein said second fluid controller is mounted on one of said weights and having a member connected to the other of said weights.

3. A controlled vehicle suspension system of the type having sprung and unsprung weights comprising, in combination, fluid actuated means connected between said weights and including a port; fluid translating means for supplying pressurized fluid to said fluid actuated means; a first fluid controller including a casing; a movable element in said casing, said movable element including a first surface exposed to fluid pressure in a first chamber and a second surface exposed to fluid pressure in a second chamber, said fluid controller having a first position wherein said port is isolated from said translating means and a low pressure zone, a second position wherein said port is connected to said translating means, and a third position wherein said port is connected to said zone; a second fluid controller; first passage means for delivering said pressurized fluid to said second fluid controller; second passage means for delivering fluid from said second fluid controller to said first chamber; third passage means for delivering fluid from said second controller to said second chamber; movable means in said second fluid controller having a first position isolating said first passage means from said other two passage means, a second position connecting said first and second passage means, and a third position connecting said first and third passage means; means for shifting said movable means in said second fluid controller between certain of said positions responsive to a force imposed on said vehicle; time delay means for effecting a delay in the response of certain of said fluid controllers to variations in said imposed force; and means for automatically varying the rate of movement of said time delay means between certain positions of movement of said time delay means.

4. The apparatus defined in claim 3 wherein said time delay means includes a fluid dampener connected to said movable means in said second fluid controller for effecting a delay in the response of certain of said controllers to said variations in said imposed force; and automatic sensing means for rendering said time delay means inoperative responsive to a second force imposed on said vehicle.

5. The apparatus defined in claim 3 wherein said time delay means is provided with a fluid dampener connected to said movable means in said second fluid controller.

6. The apparatus defined in claim 3 wherein said time delay means includes a fluid dampener connected to said movable means in said second fluid controller; fourth passage means for receiving fluid translated by movement of said fluid dampener; a flow restrictor for said fourth passage means; automatic sensing means for rendering said time delay means inoperative responsive to a second force imposed on said vehicle; and means for decreasing the effect of said flow restrictor responsive to said second force imposed on said vehicle.

7. A controlled vehicle suspension system of the type having sprung and unsprung weights comprising, in combination, fluid actuated means connected between said weights; fluid translating means for supplying pressurized fluid to said fluid actuated means; a first controller for the flow of fluid from said translating means to said fluid actuated means; a second controller for a second flow of pressurized fluid for actuating said first controller; a movable flow control element in said second controller, said element being movable between an intermediate, an upper and a lower position responsive to relative movements between said sprung and unsprung weights; means forming a fluid chamber in said second fluid controller; a retarding element connected to said movable flow control element and disposed in said fluid chamber, said retarding element being movable with said flow control element between said positions; means for restricting movement of said retarding element from said intermediate to certain other of said positions; means for removing said restriction when said retarding means is returning to said intermediate position; a controller for rendering said restricting means inoperative when said retarding element moves from said intermediate position to certain other of said positions, said controller being automatically operatively responsive to a force to which said vehicle is subjected.

8. A vehicle suspenison system of the type having sprung and unsprung weight portions comprising, in combination, means forming a resilient air chamber operative between said weight portions; means forming a closed air system for supplying pressurized air to said resilient chamber; flow control valve means for said pressurized air in said closed system for maintaining a predetermined height distance between said sprung and unsprung weight portions; valve movement retarding means connected to said flow control valve means and including a cylinder, a piston mounted for reciprocation in the cylinder between a normal position, an up position, and a down position; and a retarding means controller operatively associated with said retarding means automatically effecting rapid return of said retarding means from said up and down positions to said normal position.

9. The apparatus defined in claim 8 wherein said retarding means controller includes check valve means in said piston.

10. The apparatus defined in claim 8 wherein said retarding means controller includes first and second passage means between opposite sides of said piston and first and second check valve means for a respective one of said passage means.

11. The apparatus defined in claim 8 wherein said retarding means controller includes first and second passage means between opposite sides of said piston and first and second check valve means for a respective one of said passage means and wherein said cylinder includes an inner surface provided with a recess communicating with said first and second passage means.

12. The apparatus defined in claim 8 including a resilient operator connected between said flow control valve means and one of said weight portions.

13. The apparatus defined in claim 8 including a resilient operator connected between said flow control valve means and one of said weight portions and wherein said retarding means controller includes check valve means in said piston.

14. The apparatus defined in claim 8 wherein said retarding means controller includes first and second passage means between opposite sides of said piston and first and second check valve means for a respective one of said passage means; and including a resilient operator connected between said flow control valve means and one of said weight portions.

15. The apparatus defined in claim 8 wherein said retarding means controller includes first and second passage means between opposite sides of said piston and first and second check valve means for a respective one of said passage means and wherein said cylinder includes an inner surface provided with a recess communicating with said first and second passage means; and including a resilient operator connected between said flow control valve means and one of said weight portions.

References Cited

UNITED STATES PATENTS 1,990,517    2/1935    Bedford.
1,664,510    4/1928    Hughes.

PHILIP GOODMAN, *Primary Examiner.*